Figure 1:
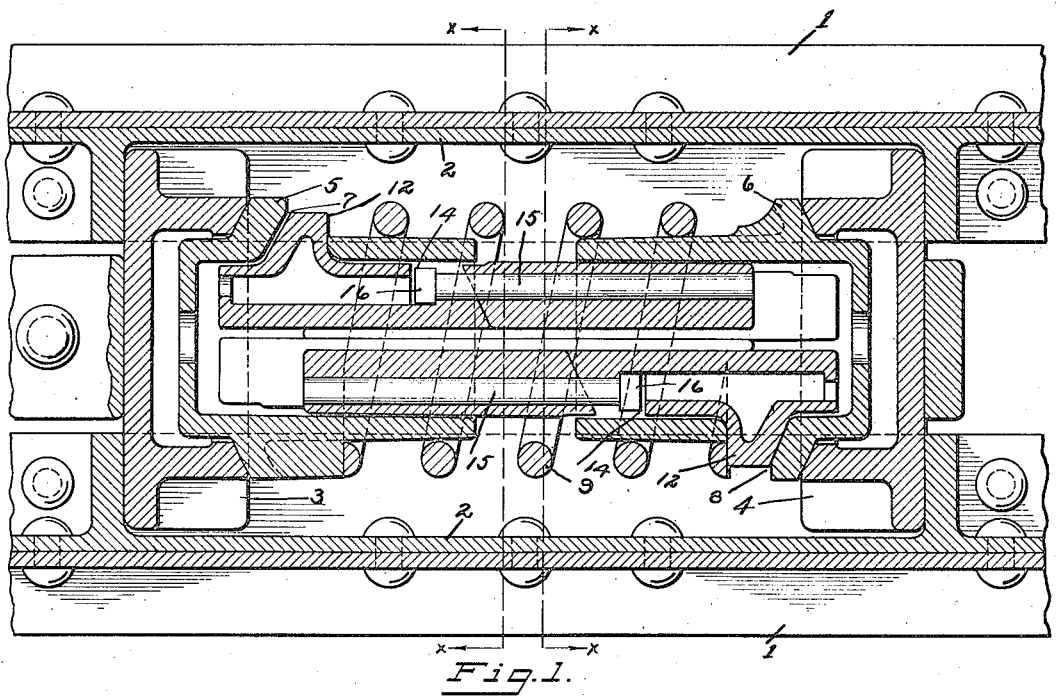

J. H. McCORMICK.
FRICTION DRAFT AND BUFFING APPARATUS.
APPLICATION FILED JAN. 15, 1912.

1,130,416.

Patented Mar. 2, 1915.

Witnesses
E. B. Maurer
A. L. Phelps

Inventor
John H. McCormick
By C. C. Shepherd
Attorney

UNITED STATES PATENT OFFICE.

JOHN H. McCORMICK, OF BEXLEY, OHIO.

FRICTION DRAFT AND BUFFING APPARATUS.

1,130,416.　　　　Specification of Letters Patent.　　Patented Mar. 2, 1915.

Application filed January 15, 1912. Serial No. 671,299.

*To all whom it may concern:*

Be it known that I, JOHN H. MCCORMICK, a citizen of the United States, residing at Bexley, in the county of Franklin and State of Ohio, have invented certain new and useful Improvements in Friction Draft and Buffing Apparatus, of which the following is a specification.

My invention relates to friction draft and buffing apparatus and is particularly designed for the attainment of a shock absorbing device, which will take care of the extremely high pressures and shocks occurring in various operations in railroad work, in such a manner that there will result a minimum wear and a maximum ease and effectiveness of resistance.

It is generally conceded in the art, that a friction buffing apparatus must be able to take care of minor shocks without unnecessary wear and must also be able to take care of heavy shocks involving high velocities. Draft gears are at present in the field which show the required resistances under low velocity impacts, but when subjected to high velocity impacts, such as occur in actual service, they fail to show these resistances and hence are not efficient devices under all conditions.

My invention recognizes the fact that there are two essentials to a draft gear of a most perfect nature, and that these essentials are the provision of the greatest possible friction surface and the greatest quantity of pressure distribution.

The main object of this invention, which is an improvement upon the subject matter of my application filed November 14, 1910, Serial Number 592,141, is to provide for a more general and equal distribution of pressure. In doing this, I attain a more rapid or earlier movement of the parts into effective wedging relation and I effect this partly by the provision of an increased number of friction wedging surfaces and partly by the provision of a greater aggregate area of effective friction surface. As a consequence, the life of my draft gear and the efficiency thereof are necessarily greatly increased.

It must be remembered that the gist of my invention does not lie in the production and maintenance of equal distribution and consequent efficiency, alone, but it resides in the maintenance of such equal distribution and equal efficiency under all conditions. My chief structural feature which insures and maintains this equal distribution resides in the provision of laterally coacting surfaces, in the nature of wedging friction surfaces at points between the ends and desirably at the center of the elements. This arrangement gives additional wedging actions and counter-actions which result in pressure at additional points and upon parts more suited and better designed to resist distortion and, nevertheless, cheaper to manufacture. One of the common drawbacks of draft gears of this general type is the tendency of the elements to buckle and spring. I have not only overcome this draw-back, but I have increased the efficiency by greatly decreasing the tendency toward concentration of the pressures incident to shocks and jars.

Another important structural feature which I have adopted to enhance the even distribution of pressures and at the same time enlarge the effective friction surface, is the provision of inter-fitting elements which have all of their surfaces tapered and which, therefore, move more rapidly into effective resistance relation. Furthermore, since it is easier to withdraw and separate interfitting tapered parts than parts with their surface in parallelism to the body portion of the draft gear and with such surfaces contacting throughout, a more rapid and ready release is insured. Thus, I have increased and amplified the effective friction surface area and have at the same time reduced the difficulty of release.

Referring to the accompanying drawings, in which similar characters of reference designate corresponding parts, and in which—

Figure 2:
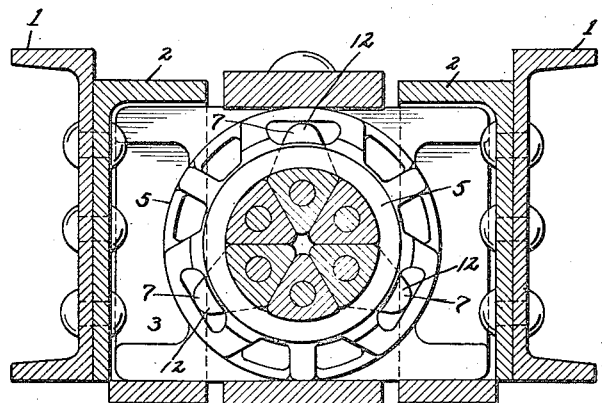
Figure 3:
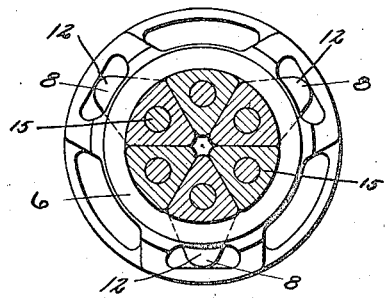
Figure 4:
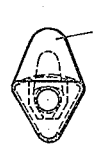
Figure 5:
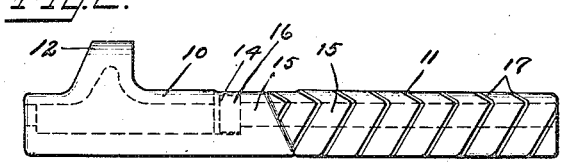

Figure 1 is a horizontal longitudinal section showing the structure of my draft gear, Fig. 2 is a transverse section taken on line $x$—$x$ of Fig. 1 and looking from the right, Fig. 3 is a section taken on line $x$—$x$ and looking from the left, being confined to the structure of the draft gear proper, Fig. 4 is an end view of one of the friction blocks utilized by me, and, Fig. 5 is a view of one of these friction blocks in side elevation.

In the drawings, 1—1 designate the sills of the car carrying the guide elements 2—2 which support the followers 3 and 4, which serve as supports for wedge elements 5 and 6 of cap form which may be termed the barrels of my device. These barrels are radially apertured as at 7 and 8 and such apertures are provided with inclined walls for wedging coaction with lugs carried by the friction blocks to be hereinafter described. In addition, these barrels are internally tapered to a slight degree and they are desirably embraced at their adjacent ends by a coiled spring 9.

The essential feature of novelty in my invention resides in the peculiar structure of the friction blocks shown in Figs. 4 and 5. These blocks are desirably formed in two sections 10 and 11 and have a substantially uniform taper to correspond with the internal taper of the barrels within which they fit. The sections 10 are provided with lugs 12. At the opposite end of each section 10 from the lug 12, is provided a slot or groove 14 opening outwardly and desirably of a T-formation. This section 10 is of a comparatively soft metal under normal circumstances while the section 11 is preferably of hard material. The section 11, however, has a soft metal bolt 15 cast therein and having its head 16 protruding from one end thereof and adapted to loosely fit in the T-shaped socket 14. In assembled condition, the two sections of the block constitute a triangular or segmental element. It will be understood that these segmental elements are grouped together with adjacent elements having their lugs 12 located at opposite ends and operating in opposite barrels. Assuming that the draft gear is open, compression upon the ends of the barrels causes the friction blocks to move together and in addition to the friction effect upon the internally tapered surface of the barrels, there is a multipled friction effect at the juncture of each pair of sections comprising each friction block. Upon return of the friction device to normal position, the friction blocks have a unitary withdrawal movement owing to the connection made by the soft metal bolt. It will thus be seen that I have provided a structure comprising an effective friction surface of a greatly increased area because of this split formation of the friction blocks to spring outwardly at their central points or to bulge as it is sometimes termed. Thus I have produced an equally distributed resistance and a necessarily increased friction surface.

In the formation of the friction blocks, I find it extremely desirable to have all sides thereof inclined, as shown in Fig. 4. By this means the wedging friction surface area is amplified, not only in contact of the friction blocks with their supporting barrels, but also with each other. A further and rather important feature is the provision of the grooves 17 upon the friction blocks. These grooves are effective to gather the dirt and other smaller particles and by the continued action of the gear to conduct such particles toward the exterior thereof.

In operation of my draft gear under shock, the spring is first compressed between formations upon one of the barrels and the lugs 12 upon the friction blocks carried by the opposite barrel. Continued pressure or pressure excessive to that resisted by the spring will cause the lugs 12 to move inwardly upon the inclined walls of their apertures and simultaneously with this wedging action, a wedging friction action will take place between the inner tapered walls of the barrels and the tops of the friction block and, also between the adjacent ends of the two pieces forming each friction block. There will be a still further friction action between the inclined facing walls of the friction blocks. Upon the withdrawal of pressure, the spring readily draws the friction blocks out with a substantially unitary withdrawal action.

What I claim, is—

1. In a draft gear, a shock absorbing device comprising wedging means, and a plurality of friction blocks divided into sections, the sections of each block having wedging engagement with each other and adjacent blocks being arranged to have relative movement longitudinally while in frictional engagement with each other.

2. In a draft gear, a shock absorbing device comprising wedging means, sectional friction blocks in multiple units of hard and soft metal alternated, and loose soft metal connections between the said sections of each block.

3. In a draft gear, a shock absorbing device comprising wedging means, sectional friction blocks in multiple units of hard and soft metal alternated, the said sections having inclined meeting surfaces.

4. In a draft gear, a shock absorbing device comprising wedging means, a plurality of friction blocks disposed in contacting engagement with each other, said blocks being arranged to give the cushioning resistance by a relative movement between them when they are in contacting engagement with each other and being divided transversely into longitudinally alining sections, and faces on said blocks independent of those in contacting engagement arranged to coöperate with said means, the sections of each block having engaging surfaces to afford a limited wedging and friction movement.

5. In a draft gear, a shock absorbing device comprising wedging means, friction blocks formed in longitudinally alining sections, and connecting means between each pair of such longitudinally alining sections.

6. In a draft gear, a shock absorbing device comprising wedging means, friction blocks formed in sections, a soft metal headed bolt formed with one of said sections and each complemental section having a socket for the head of said bolt.

7. In a draft gear, a shock absorbing device comprising wedging means, and wedging friction blocks divided into connected sections the sections of each block having engaging surfaces to afford a limited wedging and friction movement.

8. In a draft gear, a shock absorbing device comprising wedging means, and a plurality of longitudinally movable friction blocks, adjacent blocks being adapted to be moved in opposite directions, said blocks being divided into longitudinally alining sections.

9. In a draft gear, a shock absorbing device comprising wedging elements, a plurality of longitudinally movable friction blocks divided into longitudinally alining sections, the contacting surfaces of said sections being inclined to present wedging faces, and connecting means between each pair of sections.

In testimony whereof I affix my signature in presence of two witnesses.

JOHN H. McCORMICK.

Witnesses:
WALTER E. L. BOCK,
A. L. PHELPS.